(12) United States Patent
Liang et al.

(10) Patent No.: US 11,955,851 B2
(45) Date of Patent: Apr. 9, 2024

(54) HAIRPIN WINDING ELECTRIC MACHINE WITH MULTI-CONDUCTOR HAIRPIN ASSEMBLIES

(71) Applicant: FORD GLOBAL TECHNOLOGIES, LLC, Dearborn, MI (US)

(72) Inventors: Feng Liang, Troy, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/358,489

(22) Filed: Jun. 25, 2021

(65) Prior Publication Data

US 2021/0320570 A1 Oct. 14, 2021

Related U.S. Application Data

(62) Division of application No. 16/202,585, filed on Nov. 28, 2018, now Pat. No. 11,056,954.

(51) Int. Cl.
| | |
|---|---|
| *H02K 15/00* | (2006.01) |
| *H02K 1/16* | (2006.01) |
| *H02K 3/14* | (2006.01) |
| *H02K 3/28* | (2006.01) |
| *H02K 3/50* | (2006.01) |
| *H02K 15/02* | (2006.01) |

(52) U.S. Cl.
CPC .......... *H02K 15/0087* (2013.01); *H02K 1/16* (2013.01); *H02K 3/14* (2013.01); *H02K 3/28* (2013.01); *H02K 3/50* (2013.01); *H02K 15/024* (2013.01)

(58) Field of Classification Search
CPC .... H02K 1/16; H02K 15/0087; H02K 15/024; H02K 2203/09; H02K 3/14; H02K 3/28; H02K 3/38; H02K 3/50
See application file for complete search history.

(56) References Cited

U.S. PATENT DOCUMENTS

| | | | |
|---|---|---|---|
| 5,191,250 A | 3/1993 | Kobayashi | |
| 6,339,871 B1 * | 1/2002 | Maesoba ............ | H02K 15/0428 29/598 |
| 6,557,239 B2 | 5/2003 | Takahashi et al. | |
| 7,348,705 B2 | 3/2008 | Cai et al. | |
| 7,622,843 B2 | 11/2009 | Cai | |
| 7,721,413 B2 | 5/2010 | Guercioni | |
| 7,923,885 B2 | 4/2011 | Ogawa et al. | |
| 8,443,509 B1 | 5/2013 | De Souza et al. | |
| 9,252,645 B2 | 2/2016 | Crane | |

(Continued)

FOREIGN PATENT DOCUMENTS

| | | |
|---|---|---|
| JP | 2004064825 A | 2/2004 |
| KR | 20140064230 A | 5/2014 |
| WO | 2017168971 A1 | 10/2017 |

*Primary Examiner* — Minh N Trinh
(74) *Attorney, Agent, or Firm* — David B Kelley; Brooks Kushman P.C.

(57) ABSTRACT

An electric machine includes a stator core defining slots and a first hairpin assembly installed in the stator core. The first hairpin assembly includes first and second same hairpins, each having first and second ends and separately coated to have first and second outer coating surfaces, respectively. The hairpin assembly is in first and second ones of the slots such that the first and second outer surfaces are touching. A weld material joins the first ends and another weld material joins the second ends.

5 Claims, 7 Drawing Sheets

(56) References Cited

U.S. PATENT DOCUMENTS

| | | | |
|---|---|---|---|
| 9,379,586 B2 | 6/2016 | Rahman et al. | |
| 9,520,753 B2 | 12/2016 | Rahman et al. | |
| 10,305,354 B2 | 5/2019 | Niccolini et al. | |
| 2002/0093266 A1 | 7/2002 | Buening et al. | |
| 2003/0214190 A1 | 11/2003 | Congdon et al. | |
| 2003/0214196 A1 | 11/2003 | Cai et al. | |
| 2013/0076175 A1 | 3/2013 | Tumbell et al. | |
| 2013/0187494 A1 | 7/2013 | Hamer et al. | |
| 2014/0077636 A1 | 3/2014 | Jung et al. | |
| 2014/0184011 A1* | 7/2014 | Kaimori | H02K 15/0087 |
| | | | 310/185 |
| 2014/0319953 A1 | 10/2014 | Rahman et al. | |
| 2016/0164359 A1 | 6/2016 | Han et al. | |
| 2016/0285334 A1 | 9/2016 | Tumball et al. | |
| 2017/0353072 A1 | 12/2017 | McSherry | |
| 2018/0175690 A1 | 6/2018 | Lange et al. | |
| 2020/0169149 A1 | 5/2020 | Liang et al. | |
| 2021/0320570 A1* | 10/2021 | Liang | H02K 1/16 |

* cited by examiner

FIG. 11

HAIRPIN WINDING ELECTRIC MACHINE WITH MULTI-CONDUCTOR HAIRPIN ASSEMBLIES

CROSS-REFERENCE TO RELATED APPLICATIONS

This application is a division of U.S. application Ser. No. 16/202,585 filed Nov. 28, 2018, now U.S. Pat. No. 11,056,954, issued Jul. 6, 2021, the disclosure of which is hereby incorporated in its entirety by reference herein.

TECHNICAL FIELD

The present disclosure relates to electric machines and more specifically to electric machines that include hairpin windings formed of multi-conductor hairpin assemblies. This disclosure also relates to methods of manufacturing electric machines that include multi-conductor hairpin assemblies.

BACKGROUND

Vehicles such as battery-electric vehicles and hybrid-electric vehicles contain a traction-battery assembly to act as an energy source for the vehicle. The traction battery may include components and systems to assist in managing vehicle performance and operations. The traction battery may also include high-voltage components, and an air or liquid thermal-management system to control the temperature of the battery. The traction battery is electrically connected to an electric machine that provides torque to driven wheels. Electric machines typically include a stator and a rotor that cooperate to convert electrical energy into mechanical motion or vice versa.

SUMMARY

According to one embodiment, an electric machine includes a stator core defining slots and a first hairpin assembly installed in the stator core. The first hairpin assembly includes first and second same hairpins, each having first and second ends and separately coated to have first and second outer coating surfaces, respectively. The hairpin assembly is in first and second ones of the slots such that the first and second outer surfaces are touching. A weld material joins the first ends and another weld material joins the second ends.

According to another embodiment, a method of assembling a hairpin motor includes separately forming first and second hairpins to each have first and second legs and inserting the first legs in a first stator slot and the second legs in a second stator slot. The method further includes bending the first legs of each hairpin to form first twists and joining ends of the first twists together.

According to yet another embodiment, a method of assembling a hairpin motor includes providing separate first, second, third, and fourth hairpin blanks having separate insulation coatings and no common encasement, and bending each of the blanks to form first, second, third, and fourth hairpins each having first and second legs. The method further includes assembling the first and second hairpins on a stator core by inserting the first and second legs of the first and second hairpins into first and second slots of the stator core, respectively. The method also includes assembling the third and fourth hairpins on the stator core by inserting the first and second legs of the third and fourth hairpins into third and fourth slots of the stator core, respectively, and welding the first legs of the first and second hairpins to each other and to the second legs of the third and fourth hairpins so that the first, second, third, and fourth hairpins are electrically connected to each other via a weld.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
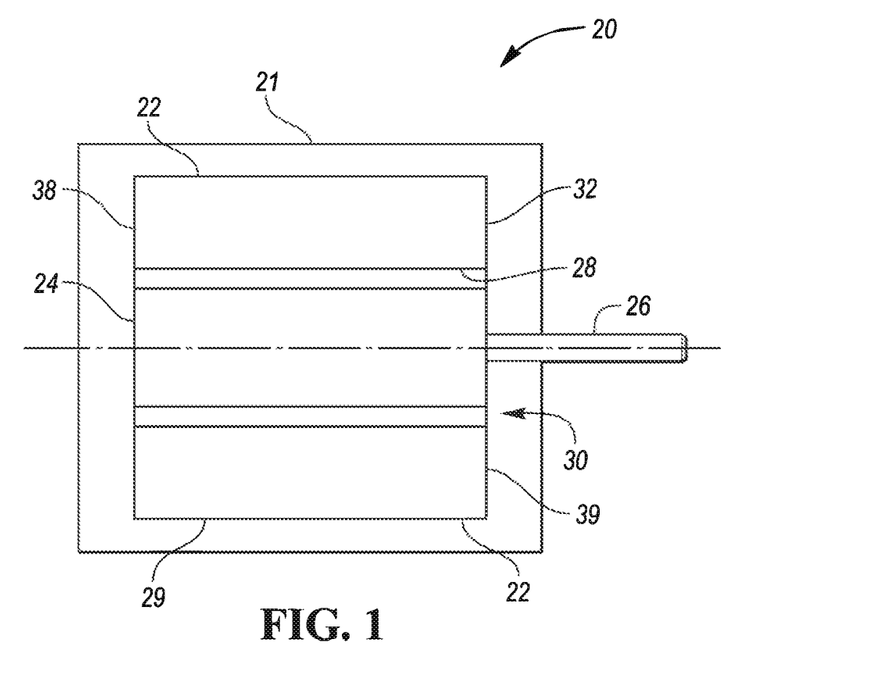
FIG. 1 is a schematic diagram of an electric machine.

Referring to FIG. 1, an electric machine 20 may be used in a vehicle such as a fully electric vehicle or a hybrid-electric vehicle. The electric machine 20 may be referred to as an electric motor, a traction motor, a generator, or the like. The electric machine 20 may be a permanent magnet machine, an induction machine, or the like. In the illustrated embodiment, the electric machine 20 is a three-phase alternating current (AC) machine. The electric machine 20 is capable of acting as both a motor to propel the vehicle and as a generator such as during regenerative braking.

The electric machine 20 may be powered by a traction battery of the vehicle. The traction battery may provide a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine 20. For example, a typical traction battery may provide a DC voltage while the electric machine 20 may require a three-phase AC voltage. The power electronics module may include an inverter that converts the DC voltage to a three-phase AC voltage as required by the electric machine 20. In a regenerative mode, the power electronics module may convert the three-phase AC voltage from the electric machine 20 acting as a generator to the DC voltage required by the traction battery. While described in the context of an electrified vehicle, the electric machine 20 may also be used in nonautomotive applications. For example, the electric machine 20 may be used in manufacturing equipment or in power-generation machines.

Figure 2:
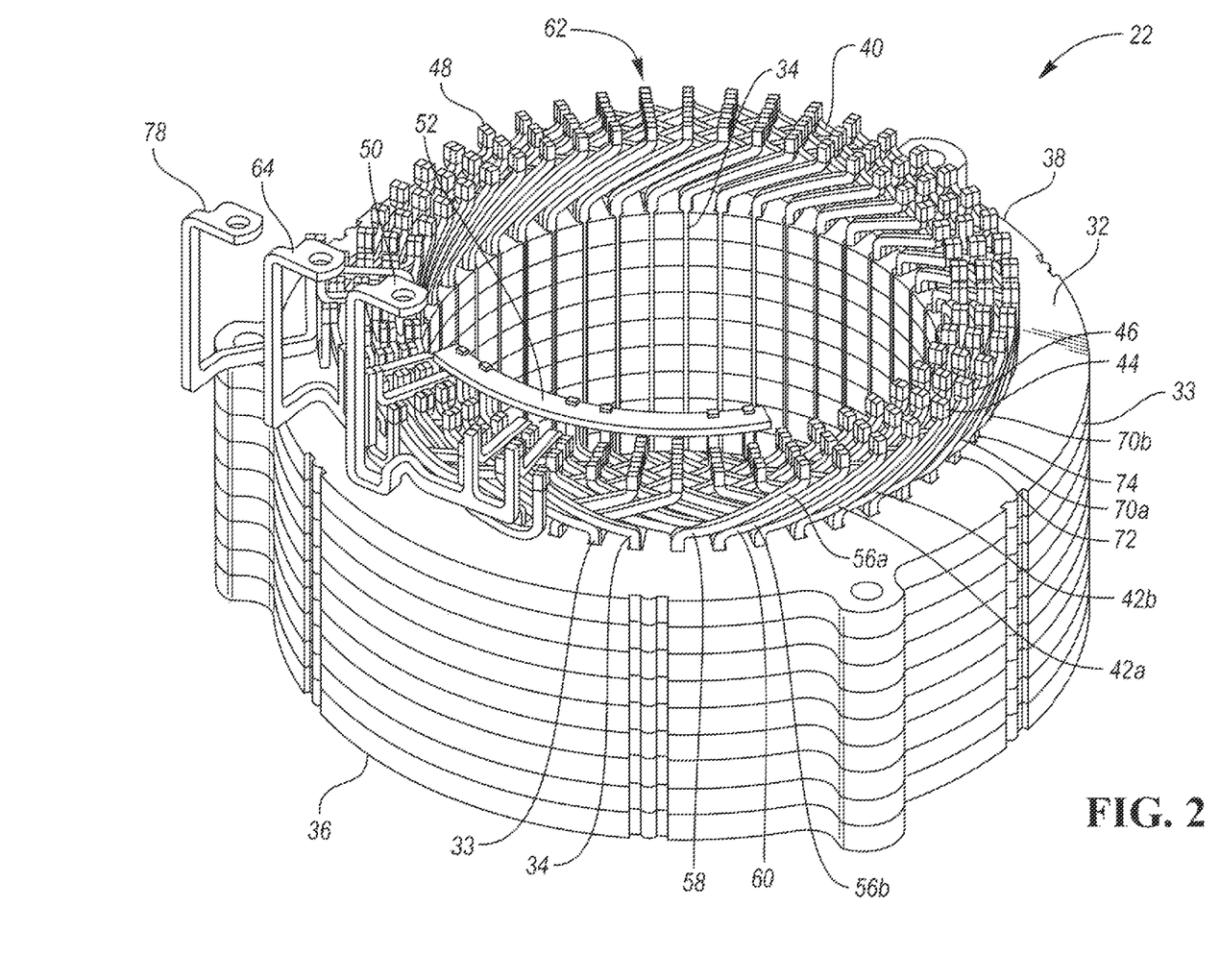
FIG. 2 is a perspective view of a stator of the electric machine.

Referring to FIGS. 1 and 2, the electric machine 20 includes a housing 21 that encloses the stator 22 and the rotor 24. The stator 22 is fixed to the housing 21 and includes a cylindrical core 32 having an inner diameter 28 that defines a hole 30 and an outer diameter 29. The core 32 may be formed from a plurality of stacked laminations 33. The rotor 24 is supported for rotation within the hole 30. The rotor 24 may include windings or permanent magnets that interact with windings of the stator 22 to generate rotation of the rotor 24 when the electric machine 20 is energized. The rotor 24 may be supported on a driveshaft 26 that extends through the housing 21. The driveshaft 26 is configured to couple with a load, such as a drivetrain of the vehicle.

The stator core 32 defines stator slots 34 circumferentially arranged and extending outwardly from the inner diameter 28. The slots 34 may be equally spaced around the circumference and extend axially from a first end 36 of the core 32 to a second end 38. In the illustrated embodiment, the core 32 defines forty-eight slots and has eight poles, but the core 32 may include more or fewer slots and/or poles in other embodiments. For example, the core 32 may define seventy-two slots and have eight poles.

The slots 34 are spaced by a circumferential distance measured between the center lines of two adjacent stator slots. This distance can be used as a unit of distance (hereinafter "a slot") for relating and measuring other components of the stator 22. The distance unit "slot" is sometimes referred to as "slot pitch" or "slot span."

The electric machine 20 may include hairpin windings 40 placed in the slots 34 of the core 32. Hairpin windings are an emerging technology that improves efficiency for electric machines used in vehicles and other contexts. The hairpin windings 40 improve efficiency by providing a greater amount of stator conductors to reduce resistance of the winding 40 without encroaching into space reserved for the electrical steel and the magnetic flux path. The hairpin windings 40 may be wave windings in which the windings 40 weave pole to pole in a wave-like pattern.

The electric machine 20 may be a three-phase AC machine in which the hairpin windings 40 are arranged in a U phase, a V phase, and a W phase. Each phase includes associated conductors (also known as pins, hairpins, or bar conductors) arranged in two parallel paths of windings in the illustrated embodiment. Each phase may include more or less parallel paths in other embodiments.

The hairpins are generally U-shaped and include a pair of legs joined by a crown. The hairpins are installed in the stator core 32 by inserting the legs through corresponding ones of the slots 34. All of the hairpins may be installed from the same end of the stator core 32, e.g., end 36, so that all of the crowns are located on one end of the stator, e.g., end 36, and the ends of the legs are located on the other end, e.g., end 38. Once installed, the legs of the hairpins are bent away from each other to form twists that connect with the twists of other hairpins. The ends of corresponding hairpins are joined by a connection such as a weld 48. The connections may be arranged in rows such as weld rows 62. End 36 may be referred to as the crown end and end 38 may be referred to as the weld end. Each path includes associated hairpins that are connected at ends of the twists to form a continuous conductor between a terminal and a neutral connection.

Traditionally, each hairpin consisted of a single, solid bar conductor, e.g., copper, bent into a desired shape. These hairpins had a relatively large cross-sectional area, which produced increased AC loss. AC loss in a conductor can be reduced by decreasing the cross-sectional area of individual conductors. That is, replacing a single bar conductor with two or more smaller conductors connected in parallel reduces AC loss and improves performance of the electric machine. This disclosure proposes to replace the traditional single bar hairpins with hairpin assemblies that include two or more hairpins connected in parallel. Each hairpin of the hairpins assemblies are connected at the ends and are electrically isolated in the middle by separate coatings of the hairpins.

The U phase may include hairpin assemblies 42a that are connected to each other to form a first path 44, and hairpin assemblies 42b that are connected to each other to form a second path 46. Each of the paths includes a first end that starts at the terminal 50 and a second end that ends at a neutral connection 52. The paths 44, 46 are connected to each other at the terminal 50 and at the neutral connection 52 but are otherwise electrically isolated from each other. Each of the paths encircles the stator core 32 by weaving in and out of select ones of the slots 34. Each hairpin assembly includes two or more separately formed hairpins that are connected in parallel at the ends of the hairpins. (Note: FIG. 2 shows the hairpin assemblies schematically as a single solid object for illustrative purposes only; in actuality, each hairpin assembly includes multiple hairpins. This will be shown in detail below.)

The V phase may include a plurality of hairpin assemblies 56a and 56b that are interconnected to form a first path 58 and a second path 60, respectively. Each of the paths includes a first end that starts at a terminal 64 and a second end that ends at the neutral connection 52. The paths 58, 60 are connected to each other at the terminal 64 and at the neutral connection 52 but are otherwise electrically isolated from each other. Each of the paths encircles the stator core 32 by weaving in and out of select ones of the slots 34.

The W phase may include a plurality of hairpin assemblies 70a and 70b that are interconnected to form a first path 72 and a second path 74, respectively. Each of the paths includes a first end that starts at a terminal 78 and a second end that ends at the neutral connection 52. The neutral connection may be a single neutral connection, e.g., a single strip of metal, used to connect all six paths, or multiple neutral connections may be used. The paths 72, 74 are connected to each other at the terminal 78 and at the neutral connection 52 but are otherwise electrically isolated from each other. Each of the paths 72, 74 encircles the stator core 32 by weaving in and out of select ones of the slots 34. The terminals 50, 64, 78 may be connected to the inverter and receive voltage from the inverter, which creates torque-producing current in the winding paths causing the rotor 24 to rotate within the stator 22.

The following figures and related text describe example hairpin assemblies that may be used in conjunction with the electric machine 20 or other electric machines that include hairpin windings.

Figure 3:
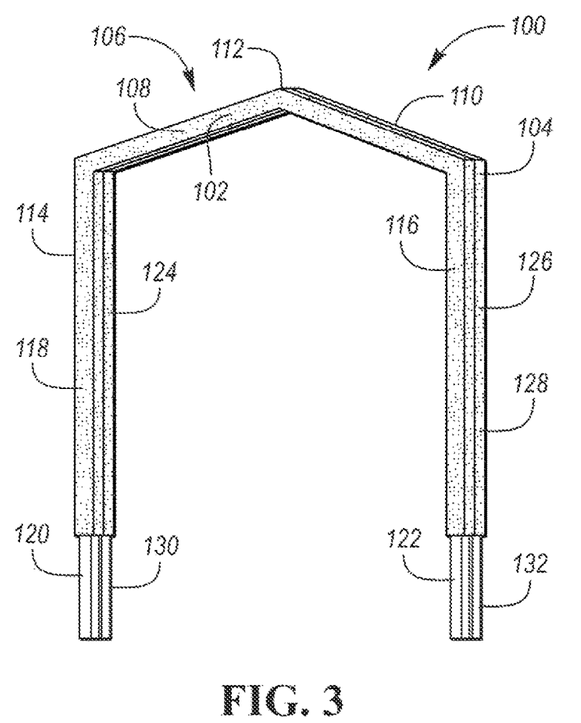
FIG. 3 is a perspective view of a hairpin assembly prior to installation in the stator.
Figure 4:
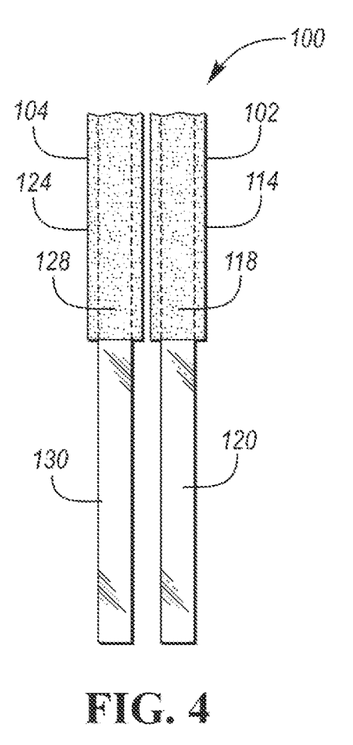
FIG. 4 is a magnified side view of the hairpin assembly of FIG. 3 near area 4-4.

Referring to FIGS. 3 and 4, an example hairpin assembly 100 (shown in a preinstalled position) includes a first hairpin 102 and a second hairpin 104 which are bent into the shape shown. The first hairpin 102 includes a crown 106 having a pair of angled segments 108, 110 that meet at a vertex 112. A first leg 114 extends from the angled segment 108 and a second leg 116 extends from the angled segment 110. The first and second legs are separated by a span of slots. The first hairpin 102 includes a coating 118 to electrically insulate the hairpin. The coating 118 is stripped away at the ends 120 and 122 so that the hairpin can be electrically connected to other hairpins. The second hairpin 104 also includes a crown having a pair of angled segments that meet at a vertex. A first leg 124 extends from one of the angled segments, and a second leg 126 extends from the other angled segment. The second hairpin 104 includes a coating 128 to electrically insulate the hairpin. The coating 128 is stripped away at the ends 130 and 132. The first and second hairpins 102 and 104 have their own insulating layer, i.e. the coatings 118 and 128, and do not have a common encasement or insulation. This allows the individual hairpins 102 and 104 to be separately formed, move relative to each other, and to be installed one at a time if so desired. In the illustrated embodiment, the hairpin assembly 100 has a span of six slots between the legs, but this span may be different in other embodiments. In some electric machines, there may be different types of the hairpin assemblies that have different shapes and/or different slot spans.

The first and second hairpins 102, 104 may be designed to have the same shape or may have different shapes. In this context "same shape" refers to design shape and contemplates minor differences due to manufacturing limitations. The first and second hairpins may be bent separately or may be stacked together and bent together into the shape shown in FIG. 3. The first and second hairpins 102, 104 may be installed into the stator slots separately or may be aligned with each other and installed together. The first and second hairpins may be connected to the ends prior to installation in the stator core or may be connected at the ends during the welding process that connected the hairpins to form the windings. This flexibility of fabrication and installation is provided by not having a common encasement for the hairpin assembly.

Figure 5A:
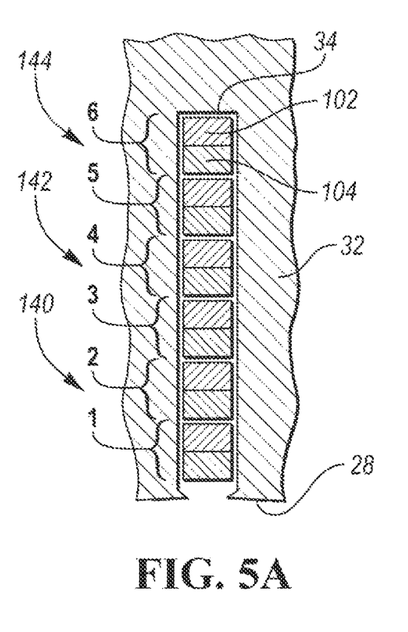
FIG. 5A is a cross-sectional end view of a stator slot with the hairpin assemblies installed.

Referring to FIG. 5A, each slot 34 includes slot positions sequentially numbered from the inner diameter 28 towards the outer diameter 29. The slots 34 may include an inner radial layer 140 of pins, a middle radial layer 142 of pins, and an outer radial layer 144 of pins. Each of the layers may include at least two radial positions that are adjacent to each other. In the illustrated embodiment, each slot 34 has six sequential positions in a one-by-six linear arrangement. The first position is near the inner diameter 28 of the stator core 32 and the sixth position is near the outer diameter 29 of the stator core 32. The inner layer 140 includes the first and second positions; the middle layer 142 includes the third and fourth positions; and the outer layer 144 includes the fifth and sixth positions.

Figure 5B:
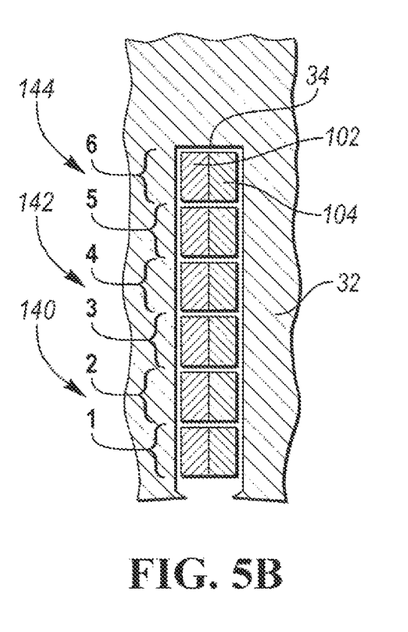
FIG. 5B is a cross-sectional end view of a stator slot with the hairpin assemblies according to an alternative embodiment.
Figure 5C:
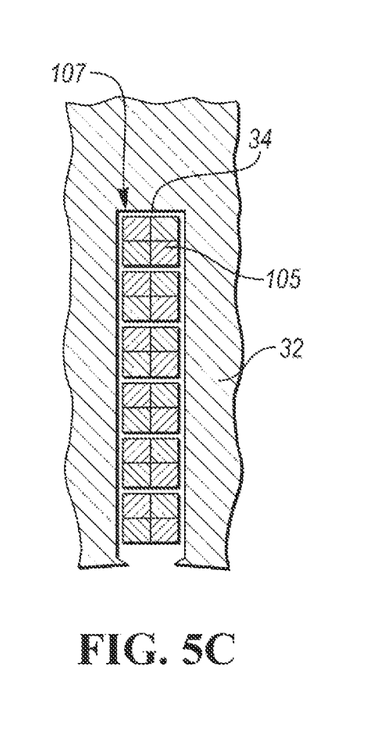
FIG. 5C is a cross-sectional end view of a stator slot with the hairpin assemblies according to another alternative embodiment.

Each slot position is sized to receive the entire hairpin assembly. In the illustrated embodiment, each slot position is sized to receive a pair of hairpins, such as hairpins 102 and 104. In FIG. 5A, the hairpins 102 and 104 of the hairpin assemblies 100 are arranged radially placing the hairpins in a one-by-twelve arrangement. But, in other embodiments, as shown in FIG. 5B, the hairpins 102 and 104 may be side-by-side, i.e., adjacent in the circumferential direction of the stator core, in a two-by-six arrangement for example. In yet other embodiments, as shown in FIG. 5C, the hairpins 105 may be side-by-side and arranged radially so that each hairpin assembly 107 includes four hairpins 105. Of course, in other embodiments, each hairpin assembly may include more or less hairpins. The hairpin assemblies of the various phases are positioned in the slots to form a desired winding arrangement. In some embodiments, each slot may only include hairpins of one of the phases, but in other embodiments, each slot may include more than one phase. Many types of winding arrangements are possible; the hairpin assemblies of this disclosure are compatible with many types of winding arrangements and this disclosure is not limited to any particular winding arrangement.

The following figures and associated text describe methods of manufacturing hairpin assemblies and assembling electric machines that have hairpin assemblies.

Figure 7:
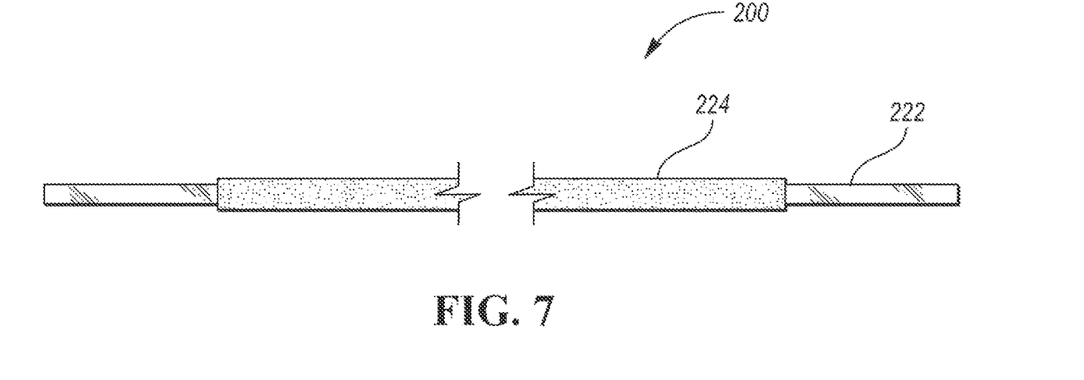
FIG. 7 is a perspective view of a hairpin blank.

Referring to FIG. 7, the method 200 begins at operation 202 where hairpin blanks (also known as bar conductors) 220 are provided. The hairpins may begin as straight blanks that include a bar conductor 222 encased in an insulation coating 224. The bar conductors 222 are formed of an electrically conductive material such as copper, gold, silver, and the like. The blanks 220 may be provided in precut strips of a desired length or may come as a coil that must be cut into blanks of a desired length. Once the blanks 220 are of the desired length, the ends are stripped (if not already done) to expose the bar conductor 222.

Figure 8:
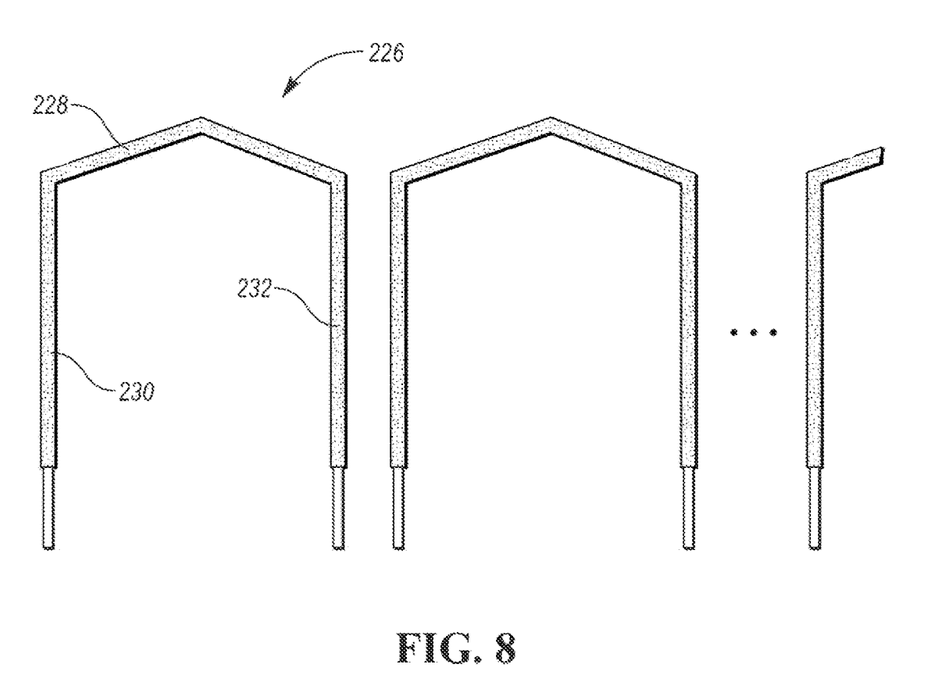
FIG. 8 is a front view of a pair of hairpins formed from the hairpin blanks prior to installation in a stator core.

Referring to FIG. 8, the blanks 220 are bent to form a plurality of hairpins 226 that each include a crown 228 and a pair of straight legs 230, 232 at step 204. Corresponding ones of the hairpins 226 will be grouped into hairpin assemblies. The blanks 220 of common hairpin assemblies may be bent to have the same shape or may have slightly different shapes. The hairpins 226 may be the same or similar to hairpins 102/104 described above.

Once the hairpins 226 are formed into the shape shown in FIG. 8, the hairpins 226 may be arranged in groups of hairpin assemblies that are then inserted into select slots of the stator core 32 at operation 206. The hairpins of a hairpin assembly may or may not be joined to each other prior to installation. Alternatively, the hairpins of each hairpin assembly may be inserted individually. For example, for each hairpin assembly, the first hairpin is inserted into first and second ones of the stator slots first and, subsequently, the second hairpin is inserted into the first and second stator slots. The legs of hairpins belonging to a same hairpin assembly are inserted into same slot positions such that outer surfaces of the coatings 224 touch each other.

Figure 9:
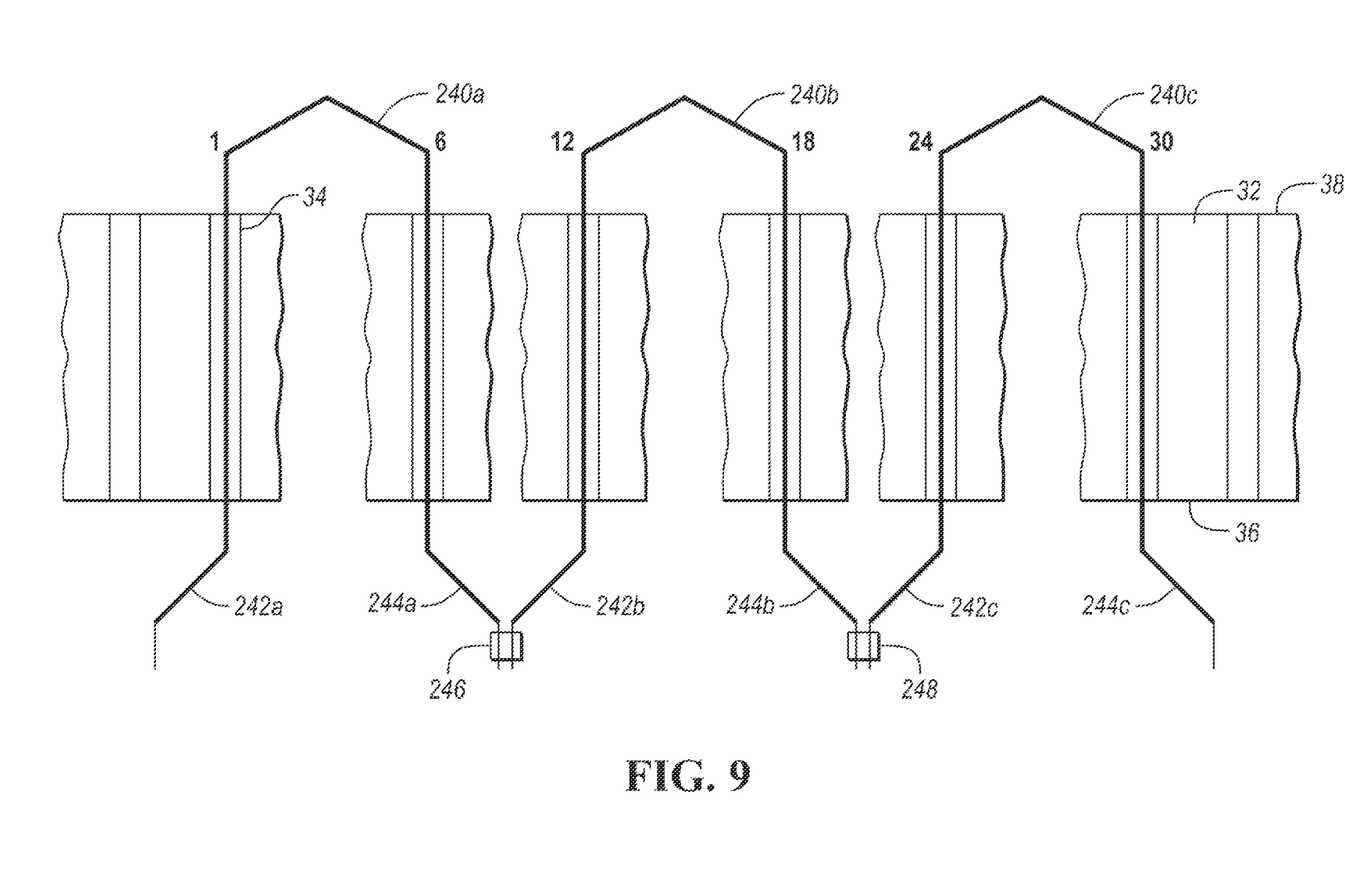
FIG. 9 is a schematic diagram of a portion of a stator core with hairpin assemblies of one path installed in corresponding stator slots.

FIG. 9 illustrates three hairpin assemblies 240a, 240b, and 240c inserted into the slots 34 of the stator core 32. In this example, the hairpin assemblies have a span of six slots and each includes first and second hairpins as described above with regards to hairpin assemblies 100. Hairpin assembly 240a has first and second legs disposed in slot 1 and slot 6, respectively; hairpin assembly 240b has first and second legs disposed in slot 12 and slot 18, respectively; and hairpin assembly 240c has first and second legs disposed in slot 24 and slot 30, respectively. At step 208, the legs 230, 232 of the hairpins are bent to form twists 242 and 244. Each of the twists may have a span that is equal to one half of the span of the hairpins, which in this case is three slots, but this need not always be the case and the twist may be longer or shorter in other embodiments. The twists 242 and 244 may be bend in substantially opposite circumferential directions so that the hairpin assemblies can be joined to other hairpin assemblies. Some electric machines may include special hairpins in which the twists extend in a same direction. The associated legs of each hairpin assembly 240 may be bent separately or together to form the twists 242. 244. Once all of the hairpins are assembled into the stator core 32 and the twists are formed, corresponding ones of the hairpin assemblies are joined to each other at operation 210. The hairpin assemblies may be joined by welding (e.g., laser welding), soldering, brazing, and the like.

In FIG. 9, the first twists 242b of assembly 240b is joined to the second twists 244a of assembly 240a by a weld 246, and the second twists 244b of assembly 240b is joined to the first twists 242c of the assembly 240c by a weld 248. The weld assemblies 240a, 240b, and 240c are electrically connected in series and form a portion of one of the paths.

Figure 10:
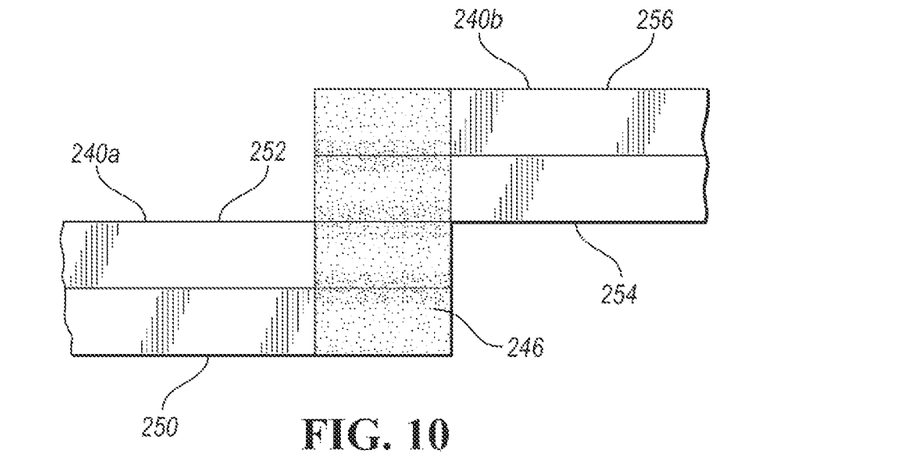
FIG. 10 is a detail view of a weld connecting a pair of hairpins assemblies together.

FIG. 10 illustrates a detail view of the weld 246. In this embodiment, the hairpins of the hairpin assembly were not joined prior to insertion. The first legs 250, 252 of the hairpin assembly 240a are joined together by the weld 246 and are joined to the second legs 254, 256 of the hairpin assembly 240b by the weld 246. The weld 246 also joins the legs 254 and 256 to each other. The remaining welds such as weld 248 may have a similar structure. The weld 246 may be formed in a single welding operation. In other embodiments, the legs 250 and 252 and the legs 254 and 256 may be joined by a first and second welds prior to installation of the hairpin assemblies in the stator core. Here, the weld 246 is used to join the hairpin assemblies 240a and 240b to each other.

After welding, the ends of the hairpin assemblies 240 are electrically connected to each other to form a pair of parallel paths that are electrically isolated from each other, except at the welds, by the insulation coatings. The conductors of the parallel paths have a reduced cross-sectional area, which decreases the AC losses as compared to a single bar conductor having a cross-sectional area that is equal to the sum of the multiple conductors of hairpin assemblies 240.

Figure 6:
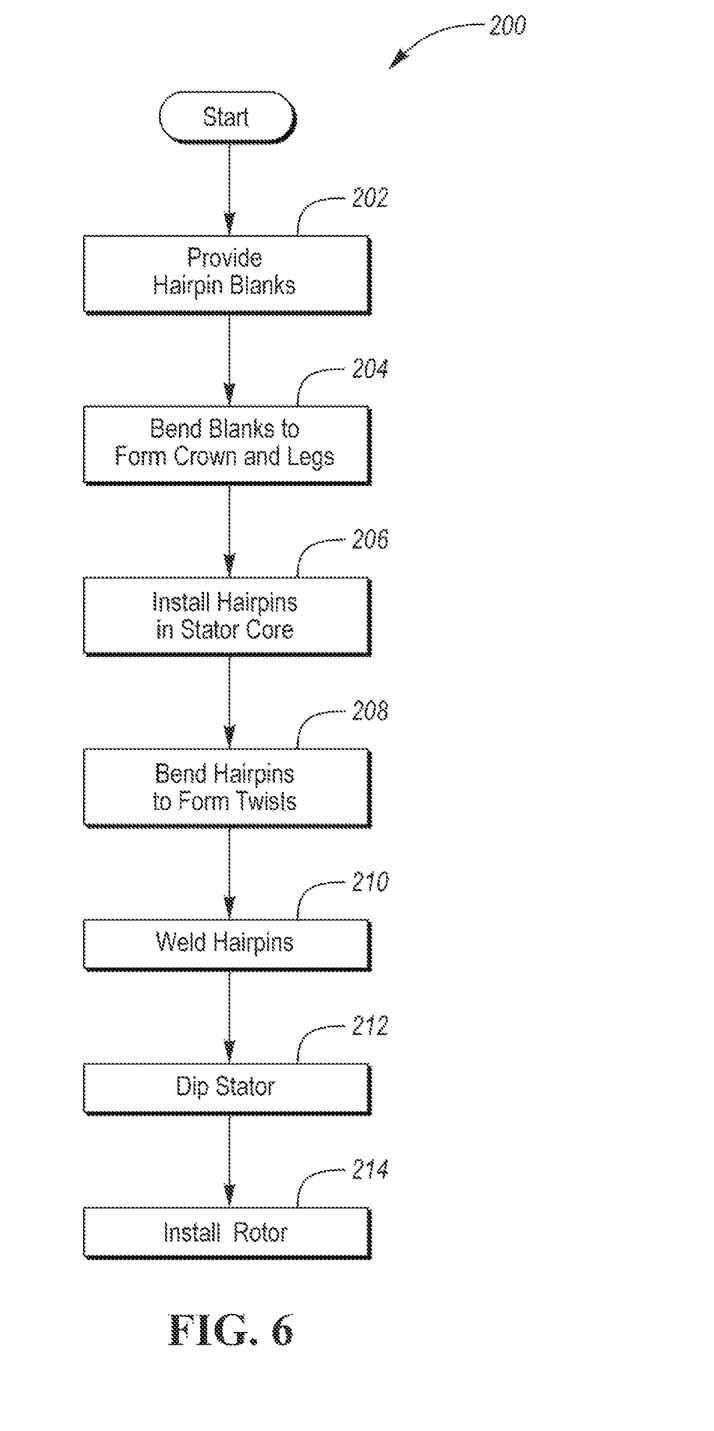
FIG. 6 is a flow chart illustrating a method of assembling an electric machine having hairpin assemblies.

The stator may be dipped in varnish or epoxy at step 212 after the windings are completed to coat the stator core and windings to provide additional insulation and add stiffness to the windings. Once the stator is assembled, the rotor may be installed into the stator at step 214. The method 200 is not an exhaustive list of all steps involved in manufacturing an electric machine. Additionally, this disclosure is not limited to the above-described sequence of steps. Some of the steps may be reordered, modified or omitted in some embodiments.

Figure 11:
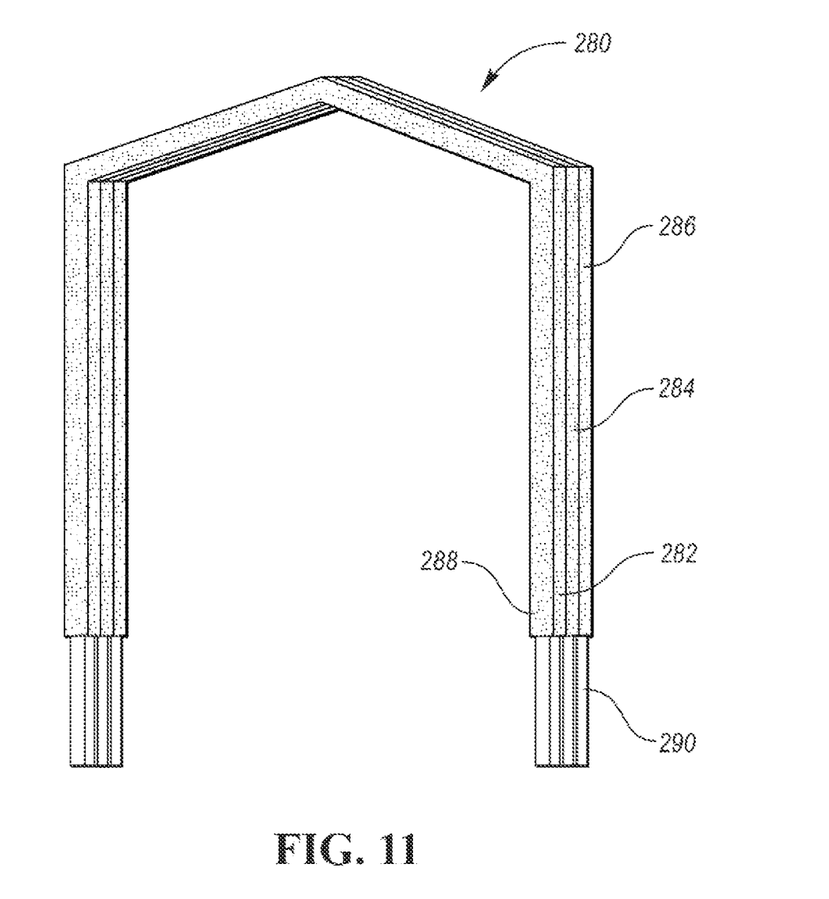
FIG. 11 is a perspective view of a hairpin assembly having three hairpins.

Referring to FIG. 11, the hairpins assemblies may have more than two hairpins. For example, FIG. 11 shows a hairpins assembly 280 that includes three hairpins 282, 284, 286. The three hairpins may be formed from individual blanks that are bent to form hairpins in the shape shown. Each of the hairpins has a coating 288 that electrically insulates the hairpins from each other. Similar to above, the ends 290 of the hairpins 282, 284, and 286 are joined at the ends 290 by welds to place the three hairpins in parallel. It is possible for the hairpins assemblies to have four or more hairpins in other embodiments, but installing and welding the hairpins may become more difficult as the number of hairpins increases reducing the benefit of having additional hairpins in the hairpin assemblies.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
a stator core defining slots;
a first hairpin assembly including first, second, and third same hairpins, each of the first, second, and third hairpins having first and second legs and each separately coated to have first, second, and third outer insulation coating surfaces, respectively, the hairpin assembly being in first and second ones of the slots such that the first, second, and third outer insulation coating surfaces are touching, wherein each of the legs includes an exposed end;
a second hairpin assembly including fourth, fifth, and sixth same hairpins, each of the fourth, fifth, and sixth hairpins having first and second legs and separately coated to have third, fourth, and fifth outer insulation coating surfaces, respectively, the second hairpin assembly being in third and fourth ones of the slots such that the fourth, fifth, and sixth outer insulation coating surfaces are touching, wherein each of the legs of the second hairpin assembly includes an exposed end;
a weld material joining the exposed ends of the first legs of the first, second, and third hairpins to each other and to the exposed ends of the first legs of the fourth, fifth, and sixth hairpins; and
another weld material joining the exposed ends of the second legs of the first, second, and third hairpins to each other, wherein the first, second, and third hairpins are electrically connected in parallel.

2. The electric machine of claim 1, wherein the first and second hairpins of the first hairpin assembly do not share a common insulation.

3. The electric machine of claim 1 further comprising a third hairpin assembly including seven, eighth, and ninth same hairpins each having first and second legs and separately coated to have seventh, eighth, and ninth outer insulation coating surfaces, respectively, the third hairpin assembly being in fifth and sixth ones of the slots such that the seventh, eighth, and ninth outer insulation coating surfaces are touching, wherein the another weld material joins the first ends of the seventh, eighth, and ninth hairpins to each other and joins the first ends of the seventh, eighth, and ninth hairpins to the second ends of the first and second hairpins of the first hairpin a assembly.

4. The electric machine of claim 1, wherein the first hairpin assembly and the second hairpin assembly have a same slot span.

5. The electric machine of claim 1 further comprising a rotor.

\* \* \* \* \*